US012578426B2

(12) United States Patent (10) Patent No.: US 12,578,426 B2
Jeannin et al. (45) Date of Patent: Mar. 17, 2026

(54) CHANNEL OFFSET CORRECTION FOR RADAR DATA

(71) Applicant: Infineon Technologies AG, Neubiberg (DE)

(72) Inventors: Mayeul Jeannin, Munich (DE); Maximilian Eschbaumer, Munich (DE); Farhan Bin Khalid, Munich (DE); Dian Tresna Nugraha, Bandung (ID); Andre Roger, Munich (DE)

( * ) Notice: Subject to any disclaimer, the term of this patent is extended or adjusted under 35 U.S.C. 154(b) by 717 days.

(21) Appl. No.: 17/828,151

(22) Filed: May 31, 2022

(65) Prior Publication Data

US 2023/0384418 A1 Nov. 30, 2023

(51) Int. Cl.
*G01S 7/40* (2006.01)
*G01S 13/58* (2006.01)
*G01S 13/89* (2006.01)
(52) U.S. Cl.
CPC .............. *G01S 7/40* (2013.01); *G01S 13/58* (2013.01); *G01S 13/89* (2013.01)
(58) Field of Classification Search
CPC ............. G01S 7/40; G01S 13/58; G01S 13/89
USPC ......................................................... 342/109
See application file for complete search history.

(56) References Cited

U.S. PATENT DOCUMENTS 5,023,617 A * 6/1991 Deering ................ G01S 13/931
342/70
9,229,102 B1 * 1/2016 Wright .................. G01S 13/885

10,094,920 B2 * 10/2018 Rao ............................ G01S 7/35
10,473,775 B2 * 11/2019 Slemp ....................... H01Q 3/04
10,539,645 B2 * 1/2020 Bialer ........................ G01S 3/50
10,627,483 B2 * 4/2020 Rao .......................... G01S 7/354
(Continued)

FOREIGN PATENT DOCUMENTS

CN 110622026 A * 12/2019 ............. G01S 7/352
EP 3923023 A2 12/2021
WO WO-2018071077 A2 * 4/2018 ........... G01S 13/343

OTHER PUBLICATIONS

Instantaneous ego-motion estimation using Doppler radar. Published in Oct. 2013.

(Continued)

*Primary Examiner* — Nuzhat Pervin
(74) *Attorney, Agent, or Firm* — Eschweiler & Potashnik, LLC

(57) ABSTRACT

Systems, methods, and circuitries are provided for calibrating a radar system to compensate for a channel offset. In one example, a method is disclosed for processing radar signals with a radar device. The method includes including receiving respective radar signals from respective virtual receive channels, wherein each virtual receive channel corresponds to a combination of a transmit antenna element and a receive antenna element of an antenna element array. Respective received radar data is generated from the respective radar signals and the radar date is processed to identify one or more stationary objects. Based on the radar data, an estimated radar device motion relative to the one or more stationary objects is determined. A difference between the estimated radar device motion and an expected motion of the radar device is determined and a correction vector is determined based on the difference. The correction vector to is applied to subsequent radar data.

17 Claims, 8 Drawing Sheets

(56) References Cited

U.S. PATENT DOCUMENTS

| | | | | |
|---|---|---|---|---|
| 10,684,365 B2 * | 6/2020 | Bunch | | G01S 13/87 |
| 10,725,169 B2 * | 7/2020 | Goossen | | G08G 5/21 |
| 10,816,641 B2 * | 10/2020 | Koerber | | H01Q 21/22 |
| 11,378,649 B2 * | 7/2022 | Rao | | G01S 13/42 |
| 11,397,255 B2 * | 7/2022 | Loesch | | G01S 7/40 |
| 11,422,249 B2 * | 8/2022 | Roger | | G01S 13/584 |
| 11,874,363 B2 * | 1/2024 | Lee | | G01S 7/41 |
| 2009/0021423 A1 * | 1/2009 | Cheng | | G01S 13/89 |
| | | | | 342/25 A |
| 2015/0198697 A1 * | 7/2015 | Kishigami | | G01S 7/2923 |
| | | | | 342/145 |
| 2015/0247924 A1 * | 9/2015 | Kishigami | | G01S 7/411 |
| | | | | 342/146 |
| 2015/0369912 A1 * | 12/2015 | Kishigami | | G01S 13/34 |
| | | | | 342/104 |
| 2016/0097847 A1 * | 4/2016 | Loesch | | G01S 13/931 |
| | | | | 342/156 |
| 2017/0097410 A1 * | 4/2017 | Liu | | G01S 13/589 |
| 2018/0011170 A1 * | 1/2018 | Rao | | G01S 7/354 |
| 2018/0120414 A1 * | 5/2018 | Alcalde | | G01S 7/4004 |
| 2019/0064341 A1 * | 2/2019 | Bunch | | G01S 13/86 |
| 2019/0113618 A1 * | 4/2019 | Lukas | | G01S 13/953 |
| 2019/0170871 A1 * | 6/2019 | Henderson | | G01W 1/02 |
| 2020/0057504 A1 * | 2/2020 | Lien | | G01S 13/874 |
| 2020/0125181 A1 * | 4/2020 | Lien | | G01B 9/02083 |
| 2020/0241109 A1 * | 7/2020 | Shahvirdi Dizaj Yekan | | |
| | | | | G01S 13/02 |
| 2020/0300995 A1 * | 9/2020 | Wu | | G01S 13/931 |
| 2021/0048522 A1 * | 2/2021 | Pos | | G01S 13/882 |
| 2021/0255305 A1 * | 8/2021 | Bromberg | | G01S 7/40 |
| 2021/0270954 A1 * | 9/2021 | Kashiwagi | | G01S 13/536 |
| 2021/0364596 A1 * | 11/2021 | Roger | | G01S 7/2883 |
| 2022/0099820 A1 * | 3/2022 | Hong | | G01S 7/354 |
| 2022/0128685 A1 * | 4/2022 | Longman | | G01S 13/584 |
| 2023/0333234 A1 * | 10/2023 | Sahara | | G01S 7/356 |
| 2024/0094368 A1 * | 3/2024 | Hong | | G01S 13/72 |

OTHER PUBLICATIONS

Texas Instruments—Application Report. Published Jul. 2018.

Insantaneous Full-Motion Estimation of Arbitrary Objects using Dual Doppler Radar. Published Jun. 2014.

Bias Angle Error Self-Correction for Automotive Applications Using Phased Array Radars Installed Behind Bumpers. Published 2017.

* cited by examiner

CHANNEL OFFSET CORRECTION FOR RADAR DATA

FIELD

The present disclosure relates to the field of radar circuits and in particular to methods, systems, and circuitry for using radar signals for detecting objects.

BACKGROUND

Radio frequency (RF) transceivers can be found in numerous applications, particularly in the field of wireless communications and radar sensors. In the automotive sector there is an increasing demand for radar sensors for use in detecting vehicles and other objects near a sensor-equipped vehicle.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Radar devices are often calibrated using targets having a known location. The radar device is placed in proximity to the known target and adjustments are made to the physical components of the radar device or compensative/corrective measures are implemented in the processing of the radar data to bring the radar device into calibration. For the purposes of this disclosure, the radar device is out of calibration when the detected location of a target is outside a range of acceptable error with respect to the actual location of the target. The reliance on a target having a known location to calibrate a radar device limits the opportunities to calibrate, leaving the radar device susceptible to becoming out of calibration over time as the various components age and are exposed to the elements.

Figure 1:
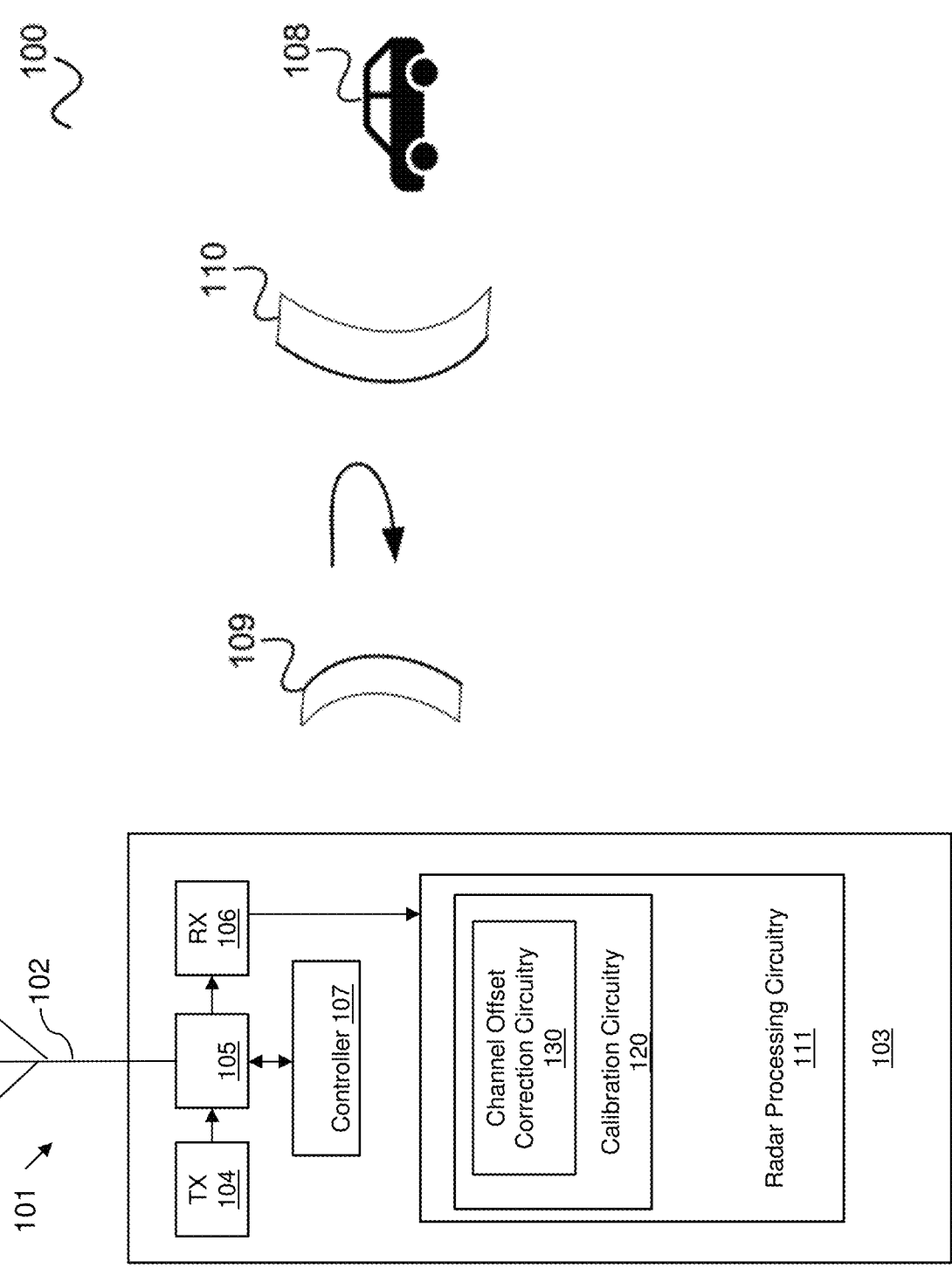
FIG. 1 illustrates an example radar arrangement.

FIG. 1 shows a radar arrangement 100. The radar arrangement 100 includes a radar device 101 that includes an antenna arrangement 102 and a radar control device 103. The radar control device 103 includes one or more (radar) transmitters 104, a duplexer 105 (i.e. a circuit to separate transmitted signals from received signals), a (radar) receiver 106 and a controller 107. The radar arrangement may include multiple transmit antennas or transmit antenna elements in form of a transmit antenna array and multiple receive antennas or receive antenna elements in form of a receive antenna array. This use of an array of multiple antenna arrangements enables the radar device to determine a relative position (angular) with respect to the radar device.

For the detection of an object 108, the controller 107 controls the one or more transmitters 104, the duplexer 105 and the receiver 106 as follows: The one or more transmitters 104 transmit a transmit signal 109 via the antenna arrangement 102 and the transmit signal 109 is reflected by a target, e.g., the object 108. The radar device 101 receives the echo 110 of the transmitted signal.

From the received signal, radar processing circuitry 111 determines information about, e.g., position and speed of the object 108. The radar processing circuitry 111 includes calibration circuitry 120 that is configured to periodically calibrate the radar system to compensate for degradation in accuracy due to effects of aging, temperature, conditions, and so on. To correct for a channel offset, the calibration circuitry 120 includes channel offset correction circuitry 130, which will be described in more detail below.

The radar device 101 may be installed in a vehicle for detection of objects in the vicinity of the vehicle, which may be advantageous for assisted driving functions, e.g., (semi-) autonomous driving.

The transmit signal 109 may include a plurality of pulses. Pulse transmission includes the transmission of short high-power bursts in combination with times during which the radar device 101 listens for echoes 110. This, however, may not be optimal for a highly dynamic situation like assisted or autonomous driving.

A continuous wave (CW) may instead be used as transmit signal. In an automotive application, a CW radar system determines range based using a phase code as a time mark. The Doppler effect may be neglected and a phase shift due to range migration from one ramp to the next is utilized as a way to estimate velocity. CW radar systems provide excellent interference mitigation. However, the CW radar system may require relatively expensive high-frequency components, such as the ADC, due to the high sampling rate employed. Thus, in the automotive context, frequency-modulated continuous wave (FMCW) radar may be used.

FMCW allows for high resolution multi-target sensing in all dimensions with a high dynamic range (e.g., power difference between strongest and weakest echo) with cost-effective lower-frequency components, such as the ADC, due to the dechirping step. FMCW allows for use of a fast ramp instead of a slow ramp so that the Doppler effect can be neglected. Instead of a frequency shift due to the Doppler effect, a phase shift due to range migration from one ramp to the next is used as a way to estimate velocity.

Figure 2:
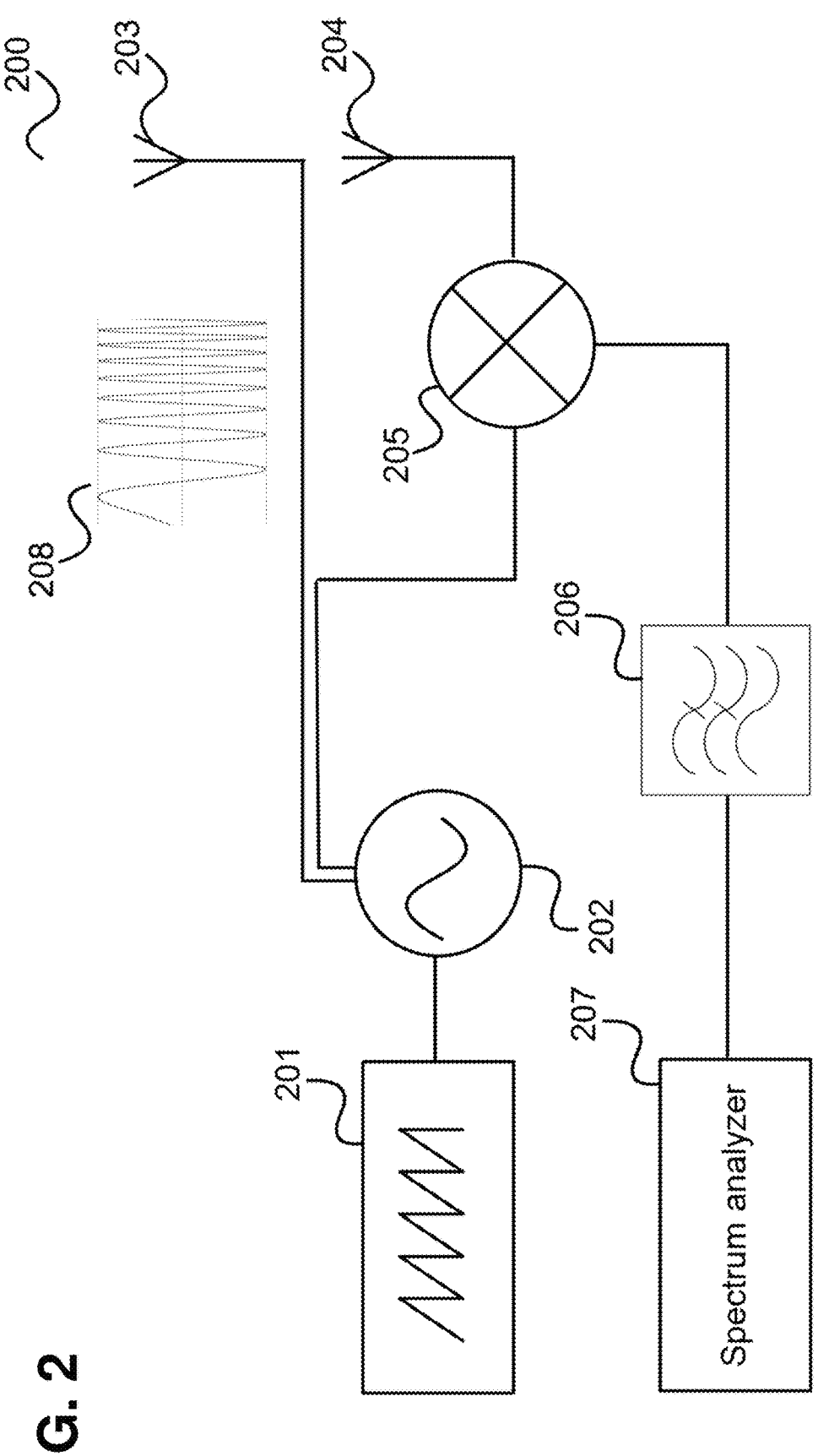
FIG. 2 illustrates an exemplary frequency-modulated continuous-wave (FMCW) radar system.

FIG. 2 illustrates an exemplary FMCW radar system 200. In an FMCW radar system, rather than the transmit signal having a constant frequency, the frequency of the transmit signal is periodically ramped up and reset according to a saw tooth (or alternatively a triangle) waveform 201. The saw tooth waveform 201 frequency-modulates an oscillator 202 and the resulting transmit signal is fed to a transmit antenna 203.

A receive antenna 204 receives the echo of the transmit signal (in addition to noise etc.) as receive signal. A mixer 205 mixes the transmit signal with the receive signal. The result of the mixing is filtered by a low pass filter 206 and processed by a spectrum analyzer 207.

The transmit signal has the form of a sequence of chirps, which are a result of the modulation of a sinusoid with the saw tooth waveform 201. One single chirp 208 corresponds to the sinusoid of the oscillator signal frequency-modulated by one "tooth" of the saw tooth waveform 201 from the minimum frequency to the maximum frequency.

As will be described in detail further below, the spectrum analyzer 207 (e.g. implemented by radar signal processing circuit 111) performs two FFT (Fast Fourier Transform) stages to extract range information (by a first stage FFT) as well as velocity information (by a second stage FFT) from the receive signal. The spectrum analyzer 207 may work on digital samples so an A/D (analog-to-digital) conversion is included in the path from the receive antenna 204 to the spectrum analyzer 207. For example, the filter 206 is an analog filter and an analog-to-digital converter (ADC) is arranged between the filter 206 and the spectrum analyzer 207.

To further allow determination of a direction (of movement) of the object 108 with respect to the radar device 101, the antenna arrangement 102 may include a plurality of receive antennas, i.e. an array of receive antenna elements. The direction of an object 108 may then be determined from phase differences by which the receive antenna elements receive an echo from an object 108. Accordingly, a radar receiver may include a mixer 205, an analog filter 206 and an ADC for each receive antenna element.

The signals received by a plurality of antenna elements may be processed by means of an MMIC (Monolithic Microwave Integrated Circuit). Since the number of receive signals that an MMIC may process in parallel is limited (and thus an MMIC can only serve a limited number of receive antenna elements), multiple MMICs may be cascaded to allow using a higher number of receive antenna elements and thus improve angular resolution of the radar device 101.

Figure 3:
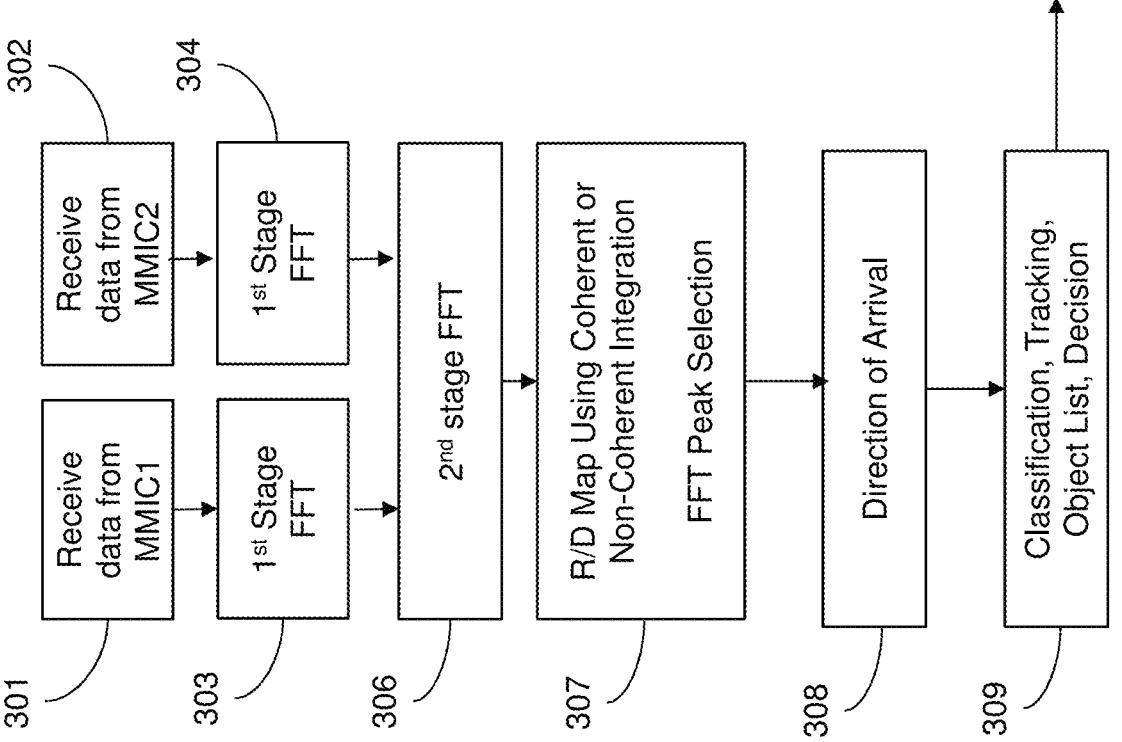
FIG. 3 illustrates an example of radar processing using two monolithic microwave integrated circuits (MMICs).

FIG. 3 illustrates the processing of radar receive signals exemplarily using two MMICs 301, 302. The processing illustrated in FIG. 3 may be performed by the radar processing circuitry of 113 of FIG. 1. The MMICs 301, 302 may be part of the receiver 106 of FIG. 1. Each MMIC 301, 302 is coupled with a plurality of antenna elements and is supplied with received signals from the respective plurality of antenna elements. The MMICs 301, 302 perform processing of the received signals like amplification, frequency down conversion (i.e. for example the functionality of mixer 205 and filter 206) and A/D conversion. The MMICs may also implement the duplexer 105, i.e. may be configured to separate transmission signals from reception signals. Each MMIC 301, 302 supplies the resulting digitized receive signals to a respective first FFT (Fast Fourier Transform) stage 303, 304. Based on the outputs of the second FFT stage 306 the radar signal processing circuit 111 determines range information as well as velocity information (e.g. in form of a R/D (range/Doppler) map) for one or more objects in a step 307.

The second stage FFT 306 goes over the result of the first FFT stages 303, 304 over multiple chirps, for each range bin, generating, per range bin, a complex value for each Doppler bin. For multiple-input-multiple-output (MIMO) radar systems, the result of the second FFT stage 306 includes, for each virtual antenna, a complex value for each combination of Doppler bin and range bin (i.e. for each Doppler/range bin). It is known that a MIMO radar system comprises a number of M transmitters and a number of N receivers, which results in M×N signals representing a number of N×M virtual antennas. This provides an antenna-specific R/D map. The terms virtual antenna and virtual channel will be used interchangeably herein.

To generate an aggregate R/D map, the MMIC-specific R/D maps are combined, e.g., by means of coherent or non-coherent integration. The velocity and range of specific objects may then be estimated by identifying peaks in the R/D map utilizing, e.g., a CFAR (Constant False Alarm Rate) algorithm. As an FFT output consists in general of complex values, a peak selection in an FFT output (such as the aggregate R/D map) may be understood as a selection based on absolute values (i.e. complex magnitudes of the complex outputs) or power (i.e. squares of absolute values).

In step 308, the radar signal processing circuit 111 may further determine the direction of arrival (DoA) of at least one object. This may be achieved based on phase differences of the output values of the second stage FFT between different (in particular virtual) receive antennas.

Based on the results obtained so far, further processing such as object classification, tracking, generation of an object list and/or decision-making (e.g. in assisted, in particular autonomous driving scenarios) may be performed in step 309. Such further processing may be conducted by a further component such as a vehicle controller.

In the exemplary use case utilizing two MMICs 301, 302, the data cube containing the digitized receive signals for all receive antennas may be split into two parts, one for each MMIC 301, 302.

Figure 4:
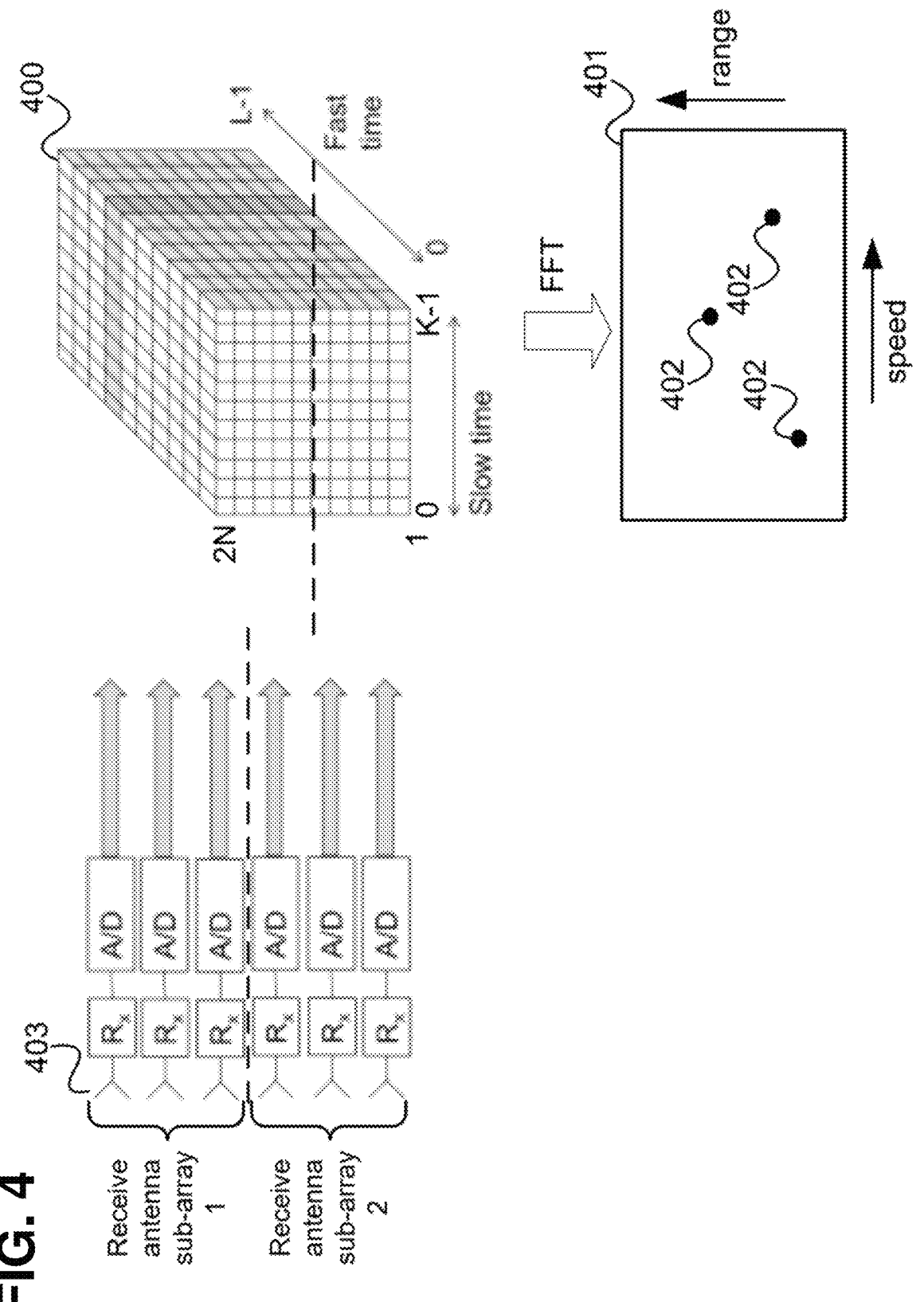
FIG. 4 illustrates an exemplary data cube.

FIG. 4 shows an exemplary illustration of a data cube 400. The data cube 400 includes digitized samples of receive signals from M antennas forming a receive antenna array 403 divided into two receive antenna sub-arrays in particular in case a single transmitter is used.

In fact, in case of the single transmitter there are N1 antennas in a first subarray and N2 antennas in a second subarray. M indicates the number of antennas of both subarrays, i.e.

$$M = N1 + N2.$$

For example, the first MMIC 301 processes receive signals received by the first receive antenna sub-array and the second MMIC 302 processes receive signals received by the second receive antenna sub-array. In particular, the MMICs 301, 302 perform analog/digital conversion to generate the digitized samples.

For example, for each chirp (e.g., K=64 chirps), the received signal is sampled to have L samples (e.g. L=512).

The L samples collected for each chirp are processed by the respective first stage FFT 303, 304.

The first stage FFT is performed for each chirp and each antenna so that the result of the processing of the data cube 400 by the first stage FFT 303, 304 has again three-dimension and may have the size of the data cube 400 but does no longer have values for L sampling times but instead values for L range bins. It is noted that usually only the 0 to L/2 range bins may be useful, as the spectrum of the first stage FFT is mirrored at L/2 and the second half may be discarded.

The result of the processing of the data cube 400 by the first stage FFT 303, 304 is then processed by the second stage FFT 306 along the chirps (for each virtual antenna and for each range bin).

The dimension of the first stage FFT is referred to as fast time, whereas the dimension of the second stage FFT is referred as slow time (direction of the chirps). In other words, L is denoted as sample dimension (fast time), K is denoted as chirp dimension (slow time) and M is denoted as antenna dimension.

The result of the second-stage FFT gives, for each virtual antenna, a range/Doppler map, which, when aggregated over the virtual antennas (e.g., using NCI (non-coherent integration) to improve the signal-to-noise ratio and have higher probability of detection), results in a range/Doppler (R/D) map 401 which has FFT peaks 402, i.e. peaks of FFT output values (in terms of absolute values) for certain range/speed combinations (i.e. for certain range/Doppler bins) which the radar signal processing circuit 111 expects to correspond to detected object(s) 108 (of a certain range and speed).

The direction of arrival (DoA) for each target is determined based on phase differences in received radar signals across the virtual channels. A succession of "target maps" may be determined based on the DoA results and the second FFT output. In the described examples, a target map is an x,y spatial map that combines range and angle (DoA) information and identifies a location and relative velocity of objects proximate the radar device. However, in practice of the described techniques, a target map may be any set of information, derived from radar data, that can convey a range, position and/or velocity of targets with respect to the radar device.

The accuracy of the DoA is limited by the uniformity and accuracy of the antenna elements of the antenna element array. Typically the antenna elements are calibrated after the radar device is installed in a vehicle or other end product. The radar device is exposed to a target having a known location with respect to the radar device and adjustments are made to cause the detected location of the target to coincide with the actual location of the target. These adjustments may be made to the antenna element array or compensation or correction may be made by way of intermediate processing of the received radar data.

The performance of the antenna elements may vary during normal operation. The accuracy of the antenna elements and related circuit components changes due to ambient temperature variations, aging effects, physical deformation of the antenna elements, and so on. These effects may cause unsatisfactory degradation of the radar device's performance and/or cause the radar device to become out of calibration.

Described herein are systems, methods, and circuitries that support calibration of the radar device using radar data received during normal operation of the radar device (e.g., in the absence of a known target). This allows the radar device to self-calibrate at any time during operation to compensate for the above mentioned factors during the life of the radar device.

Figures 5A, 5B:
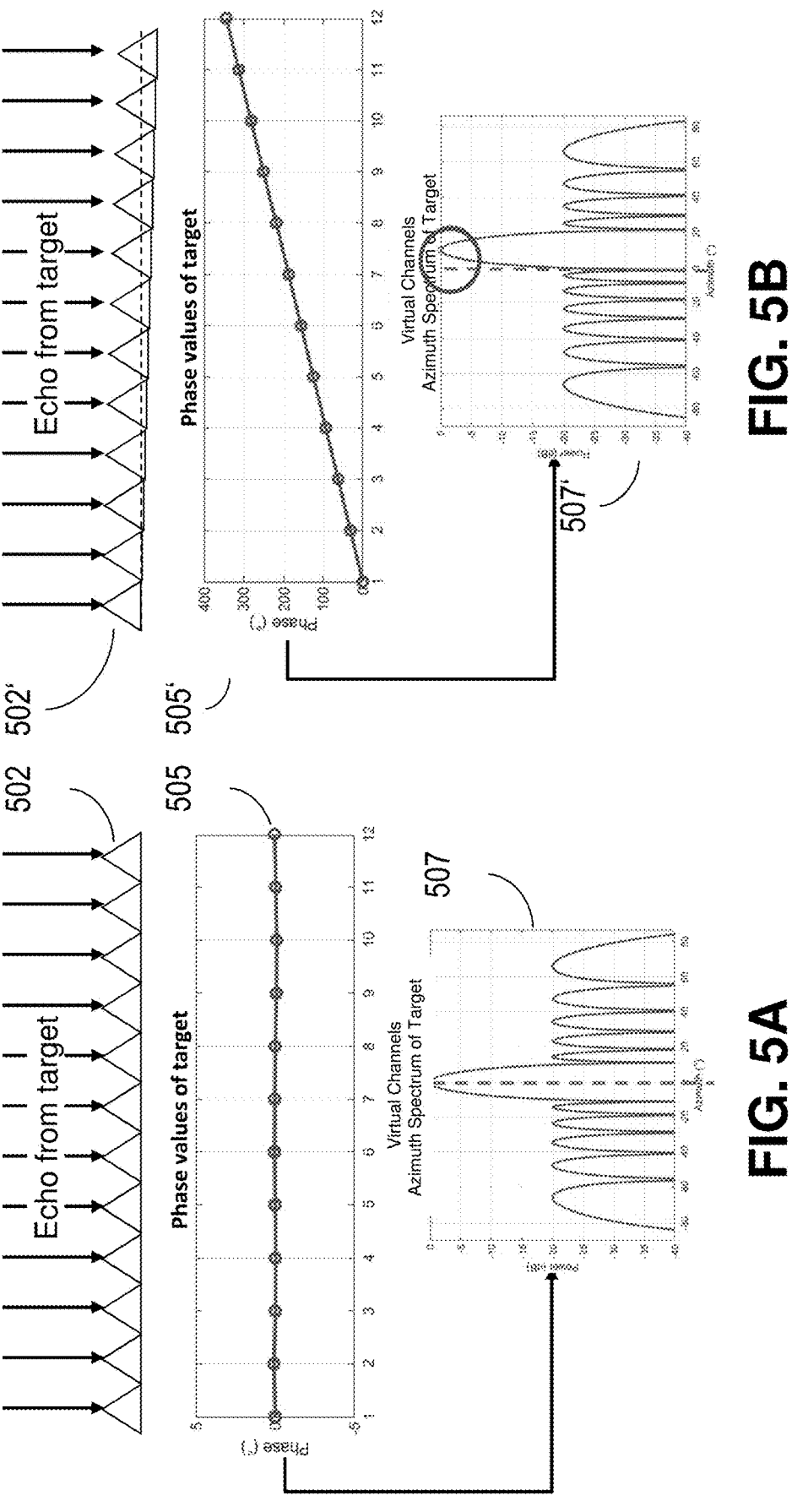
FIGS. 5A and 5B illustrate how a linear phase offset in a radar antenna element array may affect resulting azimuth spectrum data.

One type of impairment that degrades performance of a radar device is channel offset, in which a linear phase offset occurs across the virtual channels. Such a phase offset may occur gradually due to temperature/aging effects on electronic components or as a result of a physical change to the antenna element array. FIGS. 5A and 5B illustrate a channel offset. In FIG. 5A, an echo from a target which is located at front dead center of an antenna element array is received by twelve virtual channels 502. When the antenna elements are perfectly balanced, the phase of the received radar signals should be identical and equal to 0° as shown in the plot of phase values 505. Processing of these radar signals will result in the azimuth spectrum plot 507 which shows a single target at 0° with respect to the radar device (e.g., vehicle).

FIG. 5B illustrates a channel offset scenario in which a linear offset of approximately 25-30° occurs across each the twelve virtual channels 505'. With the offset in the channels, the phase of the signal on each virtual channel is shifted by the offset with respect to its immediate neighbors as shown in the plot of phase values. Processing of these radar signals will result in the azimuth spectrum plot 507' which shows a single target at about 10° to the right of the radar device. This type of inaccuracy could result in a false detection of a target within a vehicle's lane or the misclassification of a target that is in a vehicle's lane as being outside the lane.

Figures 6A, 6B, 6C:
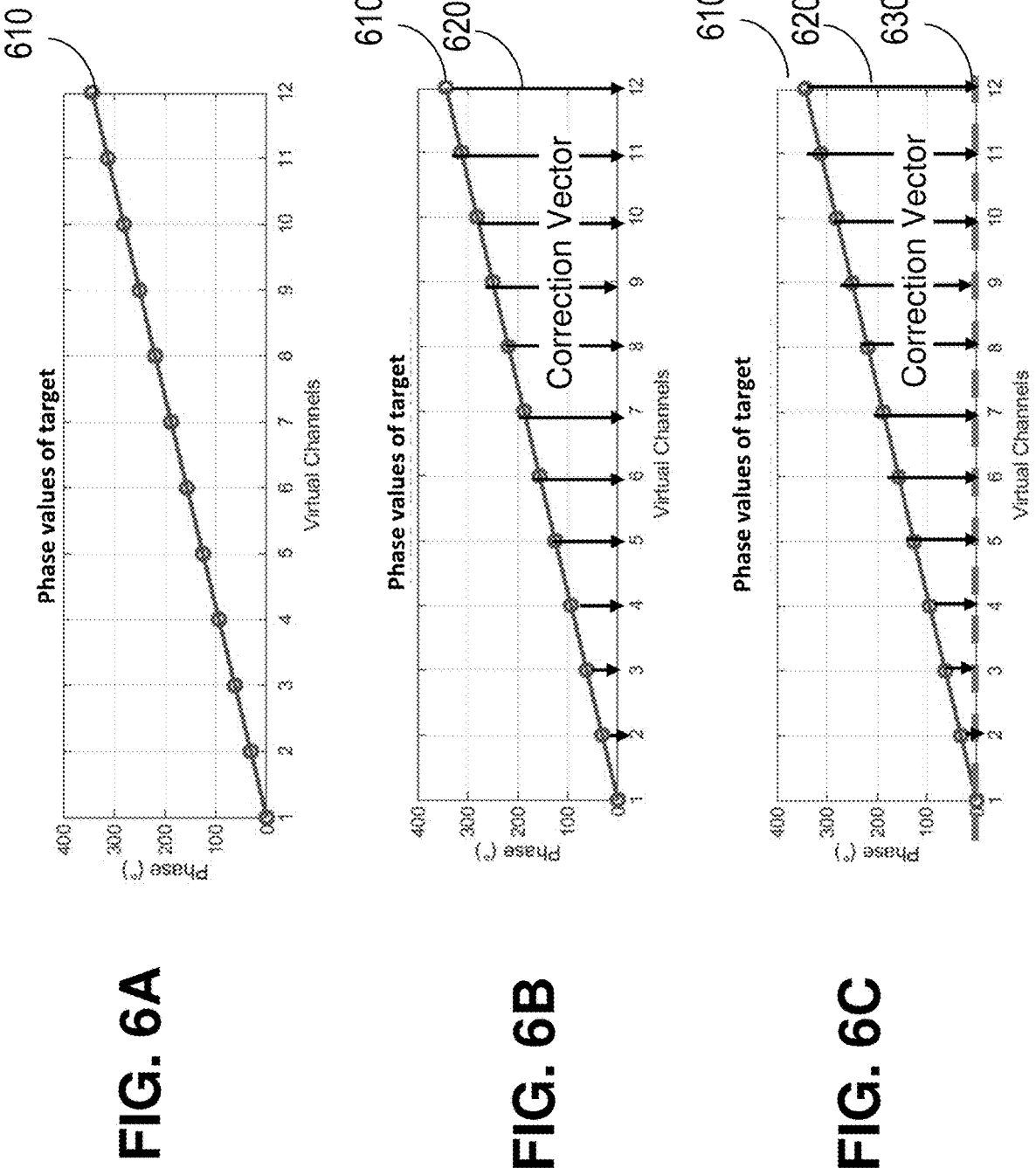
FIGS. 6A-6C illustrate an example process for correcting for a linear phase offset in a radar antenna element array, in accordance with various aspects described.

FIGS. 6A-6C illustrate the concept of a correction vector that can be applied to received radar data to correct for channel offset. In plot 6A, the received phase values 610 of the virtual channels are illustrated and the channel offset is apparent. In plot 6B a correction vector 620 is illustrated as a series of arrows each having a length indicative of a phase shift to be applied in the respective channel to correct for the channel offset. The correction vector may be determined and/or stored in the radar device as a series or set of phase values that are applied to received radar data. In plot 6C, after the correction vector 620 is applied to the original received phase values 610 the corrected phase values 630 of the virtual channels are 0°.

The target maps include inaccuracies caused by changes in the radar device since a last calibration. The calibration circuitry 120 of FIG. 1 is configured to perform calibration during "driving time" to improve the performance of the radar device. In particular, the calibration circuitry 120 includes channel offset correction circuitry 130 that determines a correction vector based on the (flawed) detected information about surrounding targets and other sensor information that is available during normal operation of the vehicle.

To support calibration during normal radar device operation, the correction vector may be determined based on an estimated motion of the radar device relative to the ground as compared to an expected motion of the radar device based on known motion constraints. Received radar data is used to determine an estimated radar device motion. Other sensor data that is available during normal operation is used to determine the expected motion of the radar device based on known motion constraints. While some of the examples in this disclosure are in the context of a radar device installed on a vehicle, it is to be understood that the techniques described herein may be employed to calibrate a radar device carried by an object or person having motion that can be determined during normal operation using radar data and some other means. For the purposes of this disclosure and claims the motion of the vehicle can be used as a proxy or interchangeably for the motion of the radar device due to the rigid mounting of the radar device to the vehicle.

Figure 7B:
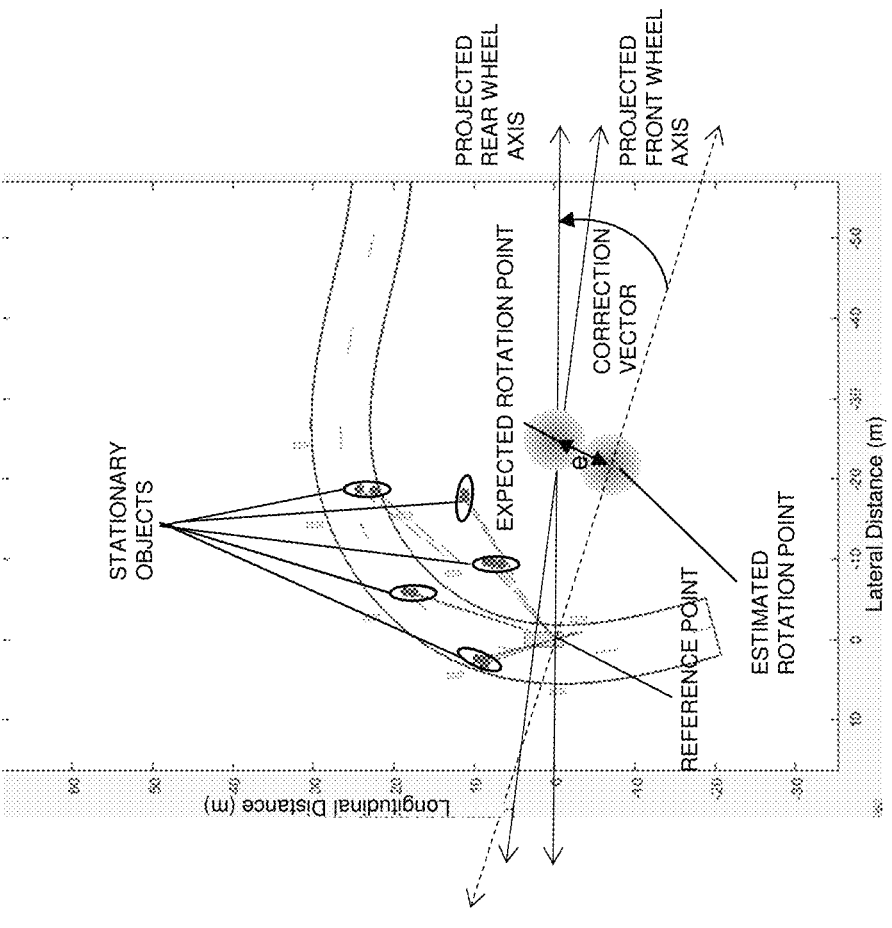
FIGS. 7A-7B illustrates a vehicle and surrounding targets having respective rotation points for the purposes of illustrating a process for correcting linear phase offset in a radar antenna element array, in accordance with various aspects described.
Figure 7A:
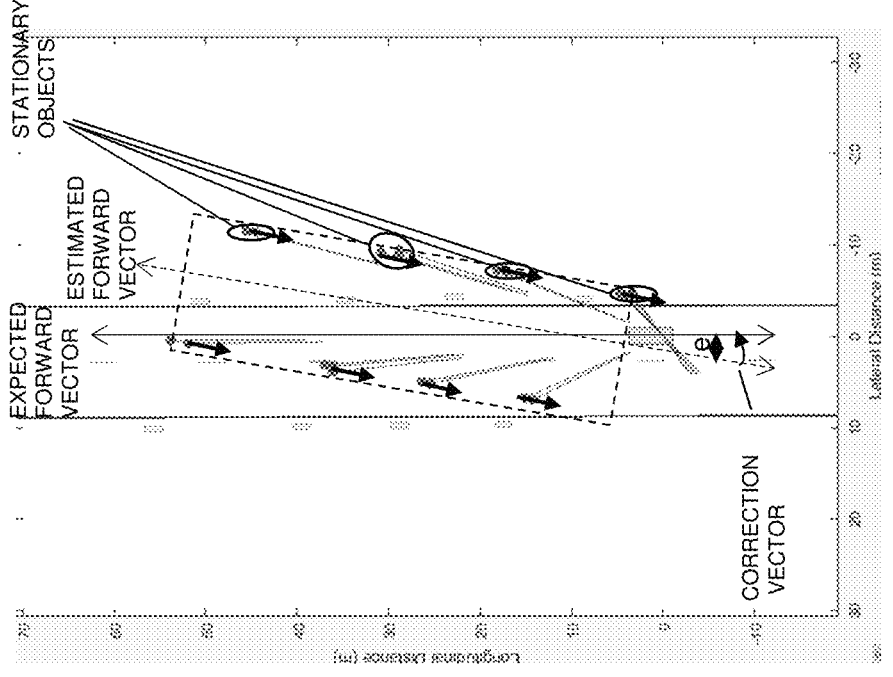

Referring to FIGS. 7A and 7B, radar data (for example, target maps) can be used to identify stationary objects proximate a vehicle. The stationary objects are illustrated as clusters of detected targets that are determined to be associated with a same stationary object. The relative motion between the stationary objects and the vehicle as determined based on successive target maps can serve as a proxy for the motion of the vehicle itself. During normal operating conditions, a vehicle may be driven in a straight line or steered to change direction about a rotation point. When the vehicle is driven in a straight line, its expected motion is subject to the constraint that no lateral motion of the vehicle is permitted (which would indicate that the vehicle is skidding or sliding). Any lateral motion detected based on radar data thus should be compensated for. When the vehicle is being turned, an estimated rotation point of the vehicle may be determined based on the relative motion of the stationary objects and the vehicle. The radar-based estimated rotation point should coincide with an expected rotation point of the vehicle that is based on motion constraints for the vehicle.

FIG. 7A illustrates how channel offset may cause radar data for stationary objects to erroneously indicate lateral motion when a vehicle is moving forward linearly. The target maps based on radar data subject to a channel offset will indicate lateral motion of the vehicle. The estimated forward vector of the one or more objects (illustrated as the dashed line of FIG. 7A) is determined based on the target maps. A correction vector may be calculated based on the difference (shown as "e" in FIG. 7A) between this estimated forward vector and an expected forward vector (illustrated as the solid line of FIG. 7A) that is determined based on constraints of vehicle motion. In the illustrated example, the expected forward vector is orthogonal to a rear wheel axis of the vehicle.

FIG. 7B illustrates how channel offset may cause radar data for stationary objects to indicate an erroneous rotation point for the vehicle. The expected rotation point for the vehicle lies on a rotation axis that is determined by the mounting point of the radar device on the vehicle. As shown in FIG. 7B, for vehicle in which only the front wheels are steered and the rear wheels are fixed, the expected rotation point for the vehicle is coincident with the intersection of the projected rear wheel axis and the projected front wheel axis. The radar data for the stationary objects is analyzed to determine an estimated rotation point for the vehicle.

When targets are stationary and the vehicle is turning, the targets will all rotate relative to the vehicle about the vehicle's rotation point. When there is no channel offset, a vehicle rotation point that is estimated based on the radar data for the stationary objects will lie on the true (or expected) instantaneous rotation point of the vehicle. When there is a channel offset, the estimated rotation point will be offset from the expected rotation point of the vehicle as shown by error "e". Thus, to calibrate the radar device to correct for the channel imbalance a correction vector is determined that will cause the estimated rotation point to coincide with the expected rotation point of the vehicle. The correction vector may be a set or series of respective phase values that are added to the respective radar data from the virtual channels to compensate for the misalignment of the virtual channels with respect to the front plane of the vehicle. As will be discussed with reference to FIG. 8, the correction vector may be applied to radar data in any of several possible processing steps.

Any number of techniques may be used to identify stationary objects based on the radar data or target maps, for example, camera data may be used to determine whether a target is stationary—for example, street signs, lamp posts, highway barriers, and so on may be identified by camera data and then used for calibration as stationary targets. In one example, stationary objects are identified based on the distribution of radial velocities of the associated targets over the azimuth angle. The radial velocities over the azimuth angle of targets associated with a stationary object are distributed along a cosine shaped line.

During calibration, the vehicle should not be exhibiting lateral motion (e.g., skidding) because then the constraints relied on to determine the estimated rotation point no longer hold. Any number of techniques, that do not rely on radar data, may be used to determine whether the vehicle is skidding and the calibration may not be performed when lateral motion is occurring.

Figure 8:
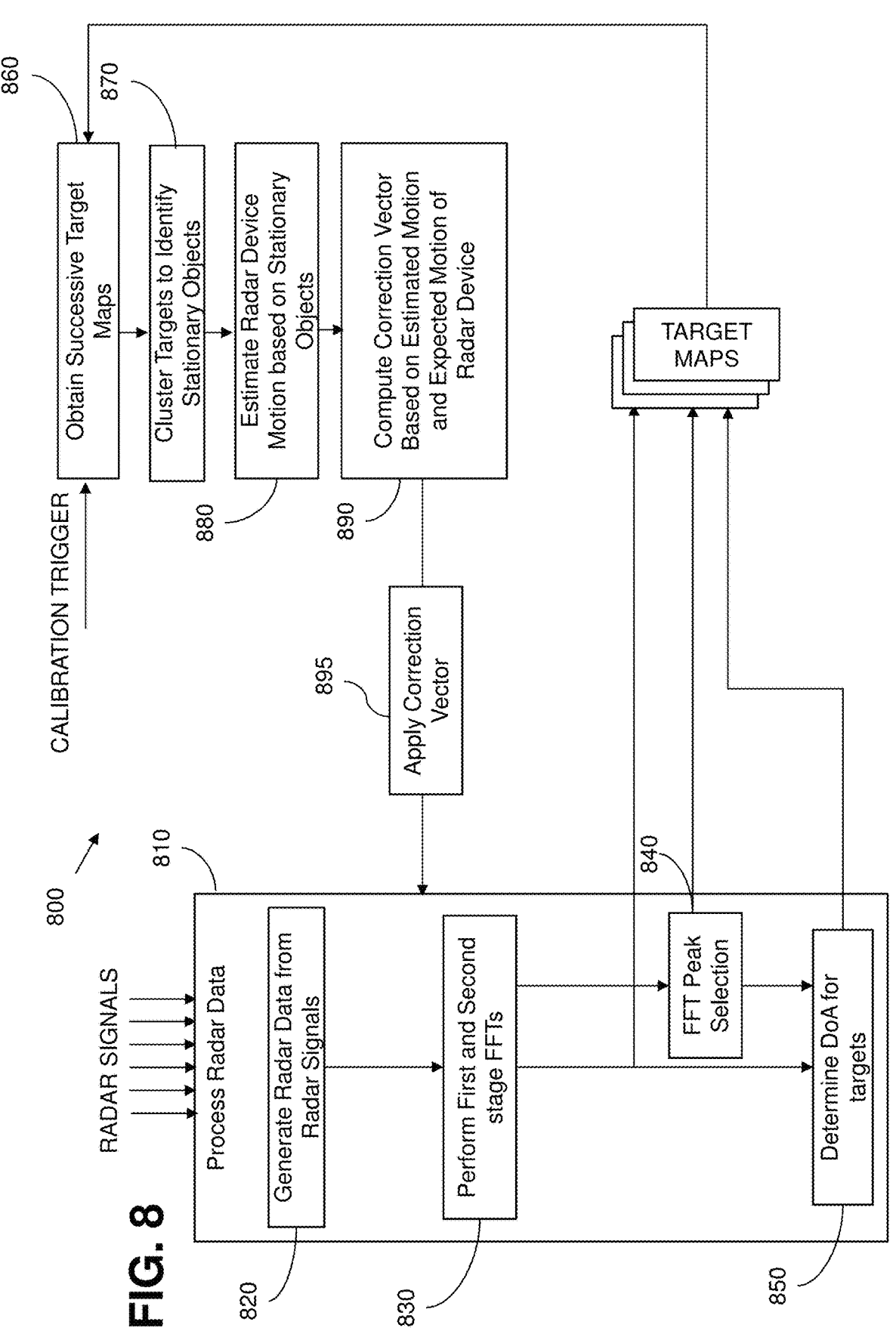
FIG. 8 illustrates an example method for correcting for linear phase offset in a radar antenna element array, in accordance with various aspects described.

FIG. 8 illustrates an example method 800 that may be performed by the radar processing circuitry 111 of FIG. 1. At 810, radar data indicative of radar signals received from virtual channels is processed to generate a series of successive target maps that each indicate a range and velocity of detected targets. As described in detail above, the processing of radar data to generate target maps may include several steps. In the illustrated example, at 820, the radar data is generated based on the received radar signals. The radar data may comprise one or more data cubes as described with respect to FIG. 4. At 830, the radar data is processed by performing first and second FFT operations and, at 840, FFT peak selection is performed to identify the targets and determine their range and speed. At 850, the method includes determining direction of arrival (DoA) information based on the results of the FFTs and the FFT peak selection. The target maps are determined based on the FFT results, the FFT peaks, and the DoA information.

In response to a calibration trigger signal, the method 800 proceeds to operations 860-895 to determine a correction vector. The calibration trigger signal may be generated or received by the calibration circuitry 120, which, in response, activates the channel offset correction circuitry 130 of FIG. 1. The calibration trigger signal may be a timed signal that occurs at a predetermined period. The calibration trigger signal may be provided by the calibration circuitry 120 contingent on a determination that the radar device is not exhibiting lateral motion. The calibration trigger signal may be generated in response to trigger criteria such as, for example, a significant change in temperature, a sensing of a fault related to the radar device, and so on.

At 860, multiple successive target maps are obtained. At 870 targets in the target maps are clustered to identify one or more stationary objects. Use of multiple stationary objects rather than a single stationary object improves the accuracy of the calibration. If only a single stationary objects is used, the number of successive target maps used for calibration should be increased significantly and scattering effects may distort the resulting calibration.

At 880, the motion of the radar device is estimated based on the motion of the one or more stationary targets as indicated in the successive target maps. As discussed with reference to FIGS. 7A and 7B, the estimated motion of the radar device may be linear or rotational. In one mode, the estimated motion of the radar device comprises an estimated forward vector determined based on radar data for stationary targets when the radar device is moving forward without a rotational component. In another mode, the estimated motion of the radar device comprises an estimated rotation point for the radar device.

The estimated motion of the radar device may be determined based on optical flow analysis techniques or any other suitable technique that uses the radar data/target maps to detect lateral or rotational motion of the radar device.

At 890, a correction vector is computed based on a difference between the estimated motion of the radar device and an expected motion of the radar device that is determined based on constraints on the radar device's motion. If there is an existing correction vector, this new correction vector is provided or stored to replace or adjust the existing correction vector. In one example, the correction vector is a set or series of respective phase values and the correction vector is applied by adding the respective phase values to respective radar data from the respective virtual channels.

At 895, the correction vector is applied to the radar data. The correction vector may be applied to radar data corresponding to respective virtual channels at any point in processing 810. In one example, the correction vector is applied to the radar data transmitted from and received by the MMICs. In another example, the correction vector may be applied to radar data transmitted by the MMICs and also to the results of the second FFT before DoA determination at 850.

It can be seen from the foregoing description that the described systems, circuitries, and methods support calibration of radar devices the correct for channel offset during normal operation, without reliance on a known target.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for generating a frequency hopping radar signal according to embodiments and examples described herein.

Example 1 is a method for processing radar signals with a radar device, including receiving respective radar signals from respective virtual receive channels, wherein each virtual receive channel corresponds to a combination of a transmit antenna element and a receive antenna element of an antenna element array; generating respective received radar data from the respective radar signals; processing the radar data to identify one or more stationary objects; and based on the radar data, determining an estimated radar device motion relative to the one or more stationary objects; determining a difference between the estimated radar device motion and an expected motion of the radar device; determining a correction vector based on the difference; and applying the correction vector to subsequent radar data.

Example 2 includes the subject matter of example 1, including or omitting optional elements, including determining that the expected motion of the radar device is forward, linear motion; determining an estimated forward vector of the radar device based on the radar data; and determining the correction vector based on the estimated forward vector of the radar device.

Example 3 includes the subject matter of example 1, including or omitting optional elements, including determining an expected rotation point of the radar device; determining an estimated rotation point of the radar device based on the radar data; and determining the correction vector based on a difference between the expected rotation point and the estimated rotation point.

Example 4 includes the subject matter of example 3, including or omitting optional elements, including determining the expected rotation point of the radar device by determining an intersection of a projected front wheel axis and a projected rear wheel axis of a vehicle in which the radar device is installed.

Example 5 includes the subject matter of example 1, including or omitting optional elements, including determining the estimated radar device motion by performing an optical flow analysis of the one or more stationary objects.

Example 6 includes the subject matter of example 1, including or omitting optional elements, wherein the correction vector includes a set of respective phase offsets associated with respective virtual receive channels.

Example 7 includes the subject matter of example 1, including or omitting optional elements, including determining a new correction vector in response to a calibration trigger signal.

Example 8 includes the subject matter of example 1, including or omitting optional elements, including applying the correction vector to radar data corresponding to results of a second FFT operation of the processing of the radar data.

Example 9 is a system for processing radar signals, including an antenna element array and radar processing circuitry. The antenna element array is configured to receive respective radar signals from respective virtual receive channels, wherein each virtual receive channel corresponds to a combination of a transmit antenna element and a receive antenna element of the antenna element array. The radar processing circuitry configured to generate respective received radar data from the respective radar signals and process the radar data to determine a series of successive target maps describing a distance and relative velocity of objects proximate the system. The system also includes channel offset correction circuitry configured to calibrate the system by, processing at least one target map to identify one or more stationary objects; and based on a plurality of successive target maps, determining an estimated radar device motion relative to the one or more stationary objects; determining a difference between the estimated radar device motion and an expected motion of the radar device; determining a correction vector based on the difference. The radar processing circuitry applies the correction vector to subsequently processed radar data.

Example 10 includes the subject matter of example 9, including or omitting optional elements, wherein the channel offset correction circuitry is configured to determine that the expected motion of the radar device is forward, linear motion; determine an estimated forward vector of the radar device based on the radar data; and determine the correction vector based on the estimated forward vector of the radar device.

Example 11 includes the subject matter of example 9, including or omitting optional elements, wherein the channel offset correction circuitry is configured to determine an expected rotation point of the radar device; determine an estimated rotation point of the radar device based on the radar data; and determine the correction vector based on a difference between the expected rotation point and the estimated rotation point.

Example 12 includes the subject matter of example 11, including or omitting optional elements, wherein the channel offset correction circuitry is configured to determine the expected rotation point of the radar device by determining an intersection of a projected front wheel axis and a projected rear wheel axis of a vehicle in which the radar device is installed.

Example 13 includes the subject matter of example 9, including or omitting optional elements, wherein the channel offset correction circuitry is configured to determine the estimated radar device motion by performing an optical flow analysis of the one or more stationary objects.

Example 14 includes the subject matter of example 9, including or omitting optional elements, wherein the correction vector includes a set of respective phase offsets associated with respective virtual receive channels.

Example 15 includes the subject matter of example 9, including or omitting optional elements, including calibration circuitry configured to activate the channel offset correction circuitry in response to a calibration trigger signal.

Example 16 includes the subject matter of example 9, including or omitting optional elements, wherein the channel offset correction circuitry is configured to apply the correction vector to radar data corresponding to results of a second FFT operation of the processing of the radar data.

Example 17 is channel offset correction circuitry configured to calibrate a radar device by, receiving successive target maps describing a distance and relative velocity of objects proximate the radar device; processing at least one target map to identify one or more stationary objects; and based on a plurality of successive target maps, determining an estimated radar device motion relative to the one or more stationary objects; determining a difference between the estimated radar device motion and an expected motion of the radar device; determining a correction vector based on the difference; and providing the correction vector to radar processing circuitry for correcting subsequently processed radar data.

Example 18 includes the subject matter of example 17, including or omitting optional elements, further configured to determine that the expected motion of the radar device is forward, linear motion; determine an estimated forward vector of the radar device based on the radar data; and determine the correction vector based on the estimated forward vector of the radar device.

Example 19 includes the subject matter of example 17, including or omitting optional elements, further configured to determine an expected rotation point of the radar device; determine an estimated rotation point of the radar device based on the radar data; and determine the correction vector based on a difference between the expected rotation point and the estimated rotation point.

Example 20 includes the subject matter of example 19, including or omitting optional elements, further configured to determine the expected rotation point of the radar device by determining an intersection of a projected front wheel axis and a projected rear wheel axis of a vehicle in which the radar device is installed.

Example 21 includes the subject matter of example 17, including or omitting optional elements, further configured to determine the estimated radar device motion by performing an optical flow analysis of the one or more stationary objects.

Example 22 includes the subject matter of example 17, including or omitting optional elements, wherein the correction vector includes a set of respective phase offsets associated with respective virtual receive channels.

Example 23 includes the subject matter of example 17, including or omitting optional elements, further configured to apply the correction vector to radar data corresponding to results of a second FFT operation of the processing of the radar data.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale.

As utilized herein, terms "module", "component," "system," "circuit," "circuitry," "element," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. A method for processing radar signals with a radar device, comprising:
   receiving respective radar signals from respective virtual receive channels, wherein each virtual receive channel corresponds to a combination of a transmit antenna element and a receive antenna element of an antenna element array;
   generating respective radar data from the respective radar signals;
   processing the radar data to identify one or more stationary objects; and
   when a vehicle in which the radar device is installed is being steered to change direction
      based on the radar data, determining an estimated radar device rotation point relative to the one or more stationary objects, based on an assumption that the one or more stationary objects have zero velocity;
      determining an expected rotation point of the radar device based on an intersection of projected front wheel axis and a projected rear wheel axis of the vehicle;
      determining a difference between the estimated radar device rotation point and the expected rotation point of the radar device;
      determining a correction vector based on the difference;
      applying the correction vector to subsequent radar data; and
      detecting objects based on the corrected subsequent radar data.

2. The method of claim 1, comprising
   when the vehicle is not being steered to change direction,
      determining that an expected motion of the radar device comprises an expected forward vector;
      determining an estimated forward vector of the radar device based on the radar data; and
      determining the correction vector based on a difference between the forward vector and the estimated forward vector of the radar device.

3. The method of claim 1, comprising determining the estimated radar device rotation point by performing an optical flow analysis of the one or more stationary objects.

4. The method of claim 2, wherein the expected forward vector is orthogonal to a rear wheel axis of the vehicle.

5. The method of claim 1, comprising determining a new correction vector in response to a calibration trigger signal.

6. The method of claim 1, comprising applying the correction vector to radar data corresponding to results of a second FFT operation of the processing of the radar data.

7. A system for processing radar signals, comprising:
   an antenna element array configured to be coupled to a radar device, the antenna element array configured to receive respective radar signals from respective virtual receive channels, wherein each virtual receive channel corresponds to a combination of a transmit antenna element and a receive antenna element of the antenna element array;
   radar processing circuitry configured to
      generate respective radar data from the respective radar signals;
      process the radar data to determine a series of successive target maps describing a distance and relative velocity of objects proximate the system; and
   channel offset correction circuitry configured to calibrate the system by
      processing at least one target map to identify one or more stationary objects;
      when a vehicle in which the radar device is installed is being steered to change direction
         based on a plurality of successive target maps, determining an estimated radar device rotation point relative to the one or more stationary objects, based on an assumption that the one or more stationary objects have zero velocity;
         determining an expected rotation point of the radar device based on an intersection of projected front wheel axis and a projected rear wheel axis of the vehicle;
         determining a difference between the estimated rotation point and the expected rotation point of the radar device; and
         determining a correction vector based on the difference; and
      wherein the radar processing circuitry applies the correction vector to subsequently processed radar data for use in detecting objects.

8. The system of claim 7, wherein the channel offset correction circuitry is configured to, when the vehicle is not being steered to change direction,
   determine that an expected motion of the radar device comprises an expected forward vector;
   determine an estimated forward vector of the radar device based on the radar data; and
   determine the correction vector based on a difference between the forward vector and the estimated forward vector of the radar device.

9. The system of claim 7, wherein the channel offset correction circuitry is configured to determine the estimated radar device rotation point by performing an optical flow analysis of the one or more stationary objects.

10. The system of claim 7, wherein the correction vector comprises a set of respective phase offsets associated with respective virtual receive channels.

11. The system of claim 7, comprising calibration circuitry configured to activate the channel offset correction circuitry in response to a calibration trigger signal.

12. The system of claim 8, wherein the expected forward vector is orthogonal to a rear wheel axis of the vehicle.

13. Channel offset correction circuitry configured to calibrate a radar device by,
   receiving radar data comprising successive target maps describing a distance and relative velocity of objects proximate the radar device;
   processing at least one target map to identify one or more stationary objects; and when a vehicle in which the radar device is installed is being steered to change direction, based on a plurality of successive target maps, determining an estimated radar device rotation point relative to the one or more stationary objects, based on an assumption that the one or more stationary objects have zero velocity;

determining an expected rotation point of the radar device based on an intersection of projected front wheel axis and a projected rear wheel axis of the vehicle;

determining a difference between the estimated radar device rotation point and the expected rotation point of the radar device;

determining a correction vector based on the difference; and providing the correction vector to radar processing circuitry for correcting subsequently processed radar data for use in detecting objects.

14. The channel offset correction circuitry of claim 13, further configured to, when the vehicle is not being steered to change direction, determine that an expected motion of the radar device comprises an expected forward vector;

determine an estimated forward vector of the radar device based on a difference between the forward vector and the radar data; and determine the correction vector based on the estimated forward vector of the radar device.

15. The channel offset correction circuitry of claim 14, wherein the expected forward vector is orthogonal to a rear wheel axis of the vehicle.

16. The channel offset correction circuitry of claim 13, wherein the correction vector comprises a set of respective phase offsets associated with respective virtual receive channels.

17. The channel offset correction circuitry of claim 13, further configured to apply the correction vector to radar data corresponding to results of a second FFT operation of processing of the radar data.

* * * * *